United States Patent [19]
Latte et al.

[11] Patent Number: 5,341,451
[45] Date of Patent: Aug. 23, 1994

[54] ARRANGEMENT FOR DEPOSITING SPLICING CASSETTES FOR LIGHT WAVEGUIDES WITHIN A CABLE SLEEVE

[75] Inventors: Frank-Helge Latte, Geltendorf; Franz-Fr. Froehlich, Hagen; Georg Boscher, Hagen; Martin Behrendt, Hagen, all of Fed. Rep. of Germany

[73] Assignee: RXS Schrumpftechnik-Garnituren GmbH, Hagen, Fed. Rep. of Germany

[21] Appl. No.: 89,557

[22] Filed: Jul. 12, 1993

[30] Foreign Application Priority Data

Jul. 17, 1992 [DE] Fed. Rep. of Germany ....... 4223675

[51] Int. Cl.⁵ .................................. G02B 6/36
[52] U.S. Cl. .................................. 385/135
[58] Field of Search .................. 385/135, 134, 147

[56] References Cited

U.S. PATENT DOCUMENTS

| | | | |
|---|---|---|---|
| 4,911,521 | 3/1990 | Ryuto et al. | 385/135 |
| 5,142,606 | 8/1992 | Carney et al. | 385/135 |
| 5,167,001 | 11/1992 | Debortoli et al. | 385/135 |
| 5,187,766 | 2/1993 | Finzel et al. | 385/135 |
| 5,231,687 | 7/1993 | Handley | 385/135 |

FOREIGN PATENT DOCUMENTS

| | | |
|---|---|---|
| 0146478 | 6/1985 | European Pat. Off. . |
| 0288808 | 11/1988 | European Pat. Off. . |
| 0333316 | 9/1989 | European Pat. Off. . |
| 2498766 | 7/1982 | France ........................ 385/135 |
| 2559916 | 4/1985 | France . |

Primary Examiner—Rodney B. Bovernick
Assistant Examiner—John Ngo
Attorney, Agent, or Firm—Hill, Steadman & Simpson

[57] ABSTRACT

An arrangement for depositing splicing cables for light waveguides within a cable sleeve provides a separate receptacle for excess length of the light waveguide leads for each of the splicing cassettes. The splicing cassettes and receptacles are respectively arranged on a carrier plate and are held in a fixing arrangement or structure so that an individual carrier plate with its respective splicing cassette can be removed without disturbing or removing the remaining carrier plates and their cassettes.

3 Claims, 4 Drawing Sheets

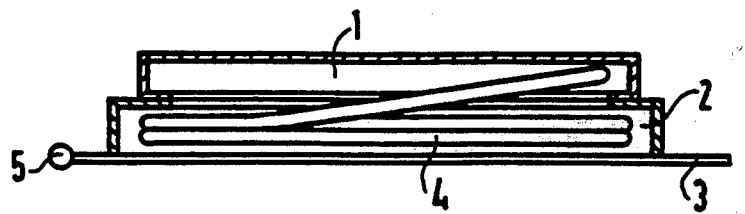
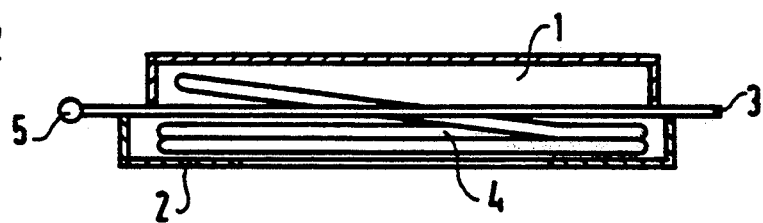
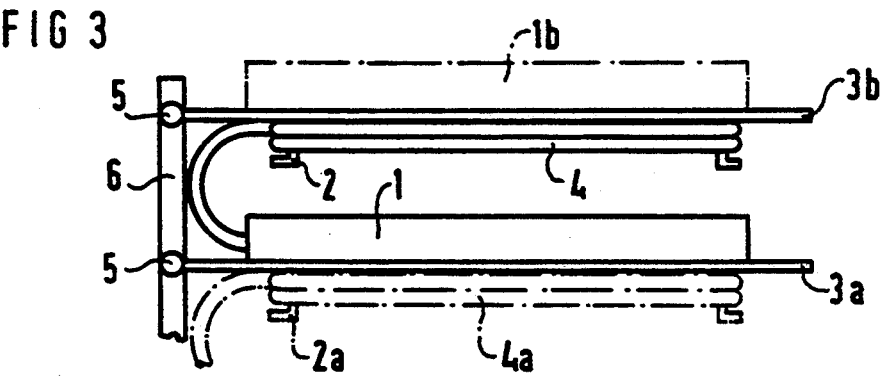

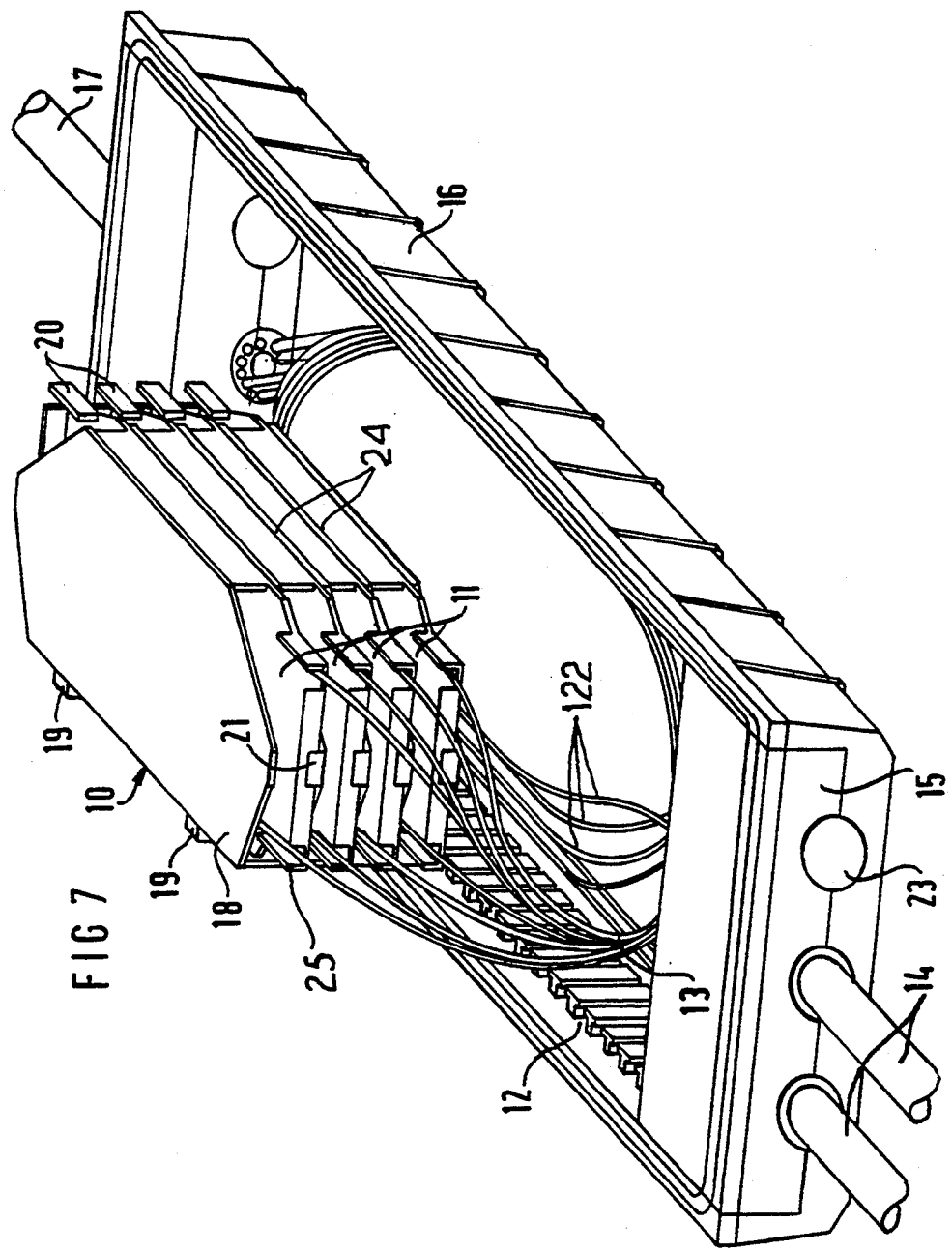

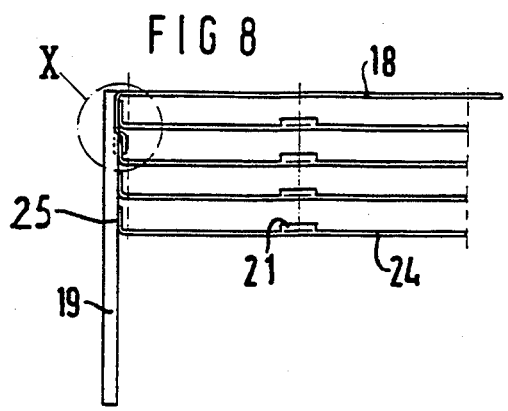
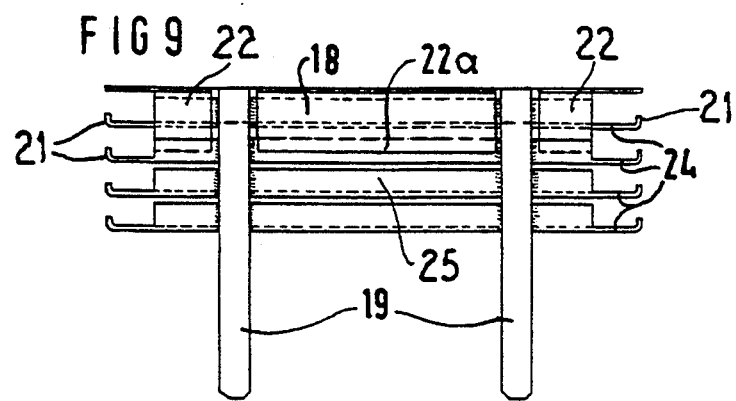
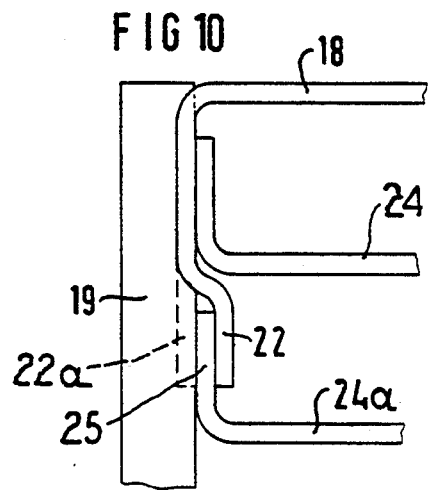

ARRANGEMENT FOR DEPOSITING SPLICING CASSETTES FOR LIGHT WAVEGUIDES WITHIN A CABLE SLEEVE

BACKGROUND OF THE INVENTION

The present invention is directed to an arrangement or device for depositing splicing cassettes for light waveguides within a cable sleeve, wherein a receptacle for excess lengths of the light waveguide leads is provided for each splicing cassette.

European Application 0 288 808 A2 discloses a cassette or pothead housing for signal transmission cables, particularly optical fiber cables, that is composed of two housing parts detachably connected to one another. The light waveguide splices are accommodated in one housing part and the excess lengths of the light waveguide leads are accommodated in the other housing part. When a plurality of these cassette housings are to be accommodated in a cable sleeve, they are usually combined to form cassette blocks, with the individual cassettes being held together by a pin. However, this leads to problems when a cassette between other cassettes must be removed. This is true of all installation technologies wherein it is not the individual fiber but the entire splicing cassette that is brought to the splicing apparatus for splicing. There are usually a plurality of splicing cassette blocks composed of 2 through 15 splicing cassettes in each cable sleeve and there are lead bundles being brought to these splicing cassettes from each side. Such a block is removed from the cable sleeve in a closed form and is potentially deposited on the installation aid. Then the splicing cassettes must be removed proceeding from the topmost cassette of the block and must be deposited on another block in the same order that they are removed in order to get to the splicing cassette that is being used. Care must thereby be exercised to see that the connection leads do not entangle with one another. The removal or respective insertion of a cassette block from or, respectively, into the cable sleeve or frame often involves complicated turning in order to shape the lead lengths in accordance with their allowable bending radii.

SUMMARY OF THE INVENTION

The object of the present invention occurs to create an arrangement for depositing splicing cassettes for light waveguide leads wherein a simple and installation-friendly acceptance of individual splicing cassettes is possible. This object is achieved by an improvement for an arrangement for depositing splicing cassettes for light waveguides within a cable sleeve which has a receptacle for excess lengths of light waveguide leads being provided for every splicing cassette, the improvements comprising the splicing cassette and a receptacle for the excess leads of the light waveguide leads being arranged in common on a carrier plate, said arrangement including fixing means for detachably holding a plurality of carrier plates so that an individual carrier plate can be removed from the fixing means while the other carrier plates remain held in the fixing means and remain in their position.

An advantage of the invention is that the bundle leads of optical fiber cables whose optical fibers are spliced in splicing cassettes can be deposited so that every individual splicing cassette given a block of a plurality of splicing cassettes can be effortlessly removed and can be deposited on a splicing device without having to remove the other splicing cassettes from their place of deposit. The required lead reserve must thereby be deposited in the cable sleeve or, respectively, the frame upon observation of the allowable bending radii so that the splicing cassette can be removed. This lead reserve respectively amounts to approximately 0.5 through 1.5 meters.

The present invention then also provides that every splicing cassette together with the receptacle allocated to it for lead reserve has a separate "drawer" or slot provided, whereby the unit is arranged on a carrier plate. The unit is then correspondingly held in the fixing means. The receptacle for the splicing reserve can now be arranged directly on the carrier plate. Another arrangement provides that the splicing cassette lies above the carrier plate while the receptacle for the lead reserve is positioned on the bottom surface of the carrier plate so that the carrier plate extends therebetween. A U-shaped carrier plate is also possible, and this is composed of two movable legs on which the splicing cassette and the receptacle for the lead reserves are fixed lying opposite one another. The receptacle can, likewise, be fashioned in the form of a splicing cassette or in the form of hooks or angles which will guide the light waveguide lead and can be directly secured to the carrier plate.

The splicing cassette together with the receptacle for the lead reserve can be joined to one another in the required number by a flap, plug-in or slide mechanism. It is, thus, possible to easily get at the respectively desired splicing cassette. The desired splicing cassette is lifted from the carrier plate, which carries the lead reserve, and the lead reserve is then withdrawn from the receptacle. The splicing cassette can now be easily brought to the splicing device. Upon reintroduction of the splicing cassette, the lead reserve is first deposited in the space or, respectively, receptacle provided therefor after the splicing event, and the splicing cassette is then again secured on the carrier plate.

A further possibility of the splicing cassette deposit in the cable sleeve or in the frame is a block version. The required number of splicing cassettes are placed directly above one another and are secured to one another in a suitable way. In a practical fashion, for example, a fan-shaped fixing means is employed according to the present invention, and the splicing cassettes are then plugged into this fan-shaped fixing means or structure. The splicing cassettes are fixed with the appropriate locking elements which, however, are releasable as needed. The desired splicing cassette can then be removed individually or in a block without having to move other splicing cassettes. A good surveyability is thereby established, since the lead reserve is only undone for the particular splicing cassette being removed.

The fan-shaped fixing means or structure can also be swung open at the back part or along an edge with a flap mechanism with hinges or with the assistance of articulations so that one can arrive at the level of desired splicing cassette by swinging the splicing cassette that lies higher away from the desired cassette. The surveyability is likewise preserved in this way.

The shaping of the bundle leads is then also advantageous in the present invention so that the splicing cassettes are cabled proceeding from only one side, which is referred to as a "butt splice". It is possible to combine all leads that proceed to the splicing cassette block to form a bundle. Dependent on the condition and length, such a bundle can then be rolled up or can be bent into loops in order to be able to store the reserve lead in the cable sleeve or in the frame. For splicing, a respective block is then taken as a whole from the cable sleeve or from the frame and is deposited on the splicing device.

Other advantages and features of the invention will be readily apparent from the following description of the preferred embodiments, the drawings and claims.

BRIEF DESCRIPTION OF THE DRAWINGS

FIG. 1 is a cross sectional view with portions in elevation for purposes of illustration of a carrier plate having a one-side arrangement of a splicing cassette and receptacle for lead reserves in accordance with the present invention;

FIG. 2 is a cross sectional view with portions in elevation for purposes of illustration of a carrier plate having a splicing cassette on one side and a receptacle secured on the opposite side;

FIG. 3 is a side view of a U-shaped carrier plate in accordance with the present invention;

FIG. 7 is a perspective view of a portion of a cable sleeve receiving a carrier block arrangement in accordance with the present invention;

FIG. 8 is an end view of a block carrier for splicing cassettes illustrated in FIG. 7;

FIG. 9 is a back view of the block carrier of FIG. 8; and

FIG. 10 is an enlarged end view of the portion received in the circle X of FIG. 8.

DESCRIPTION OF THE PREFERRED EMBODIMENTS

Figure 4:
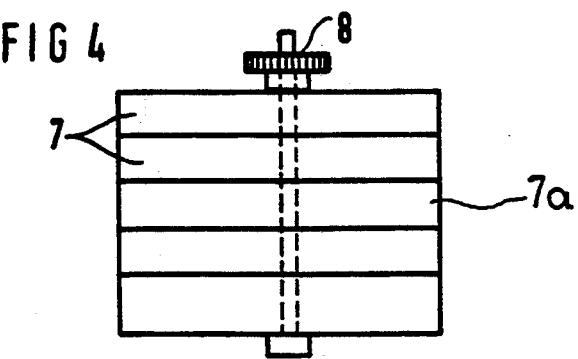
FIG. 4 is a side view of a traditional block combination of splicing cassettes.

The principles of the present invention are particularly useful when incorporated in an arrangement including a splicing cassette 1, a receptacle 2 for receiving corresponding lead reserves 4 and a carrier plate 3. As illustrated in FIG. 1, the receptacle 2 is mounted on the carrier plate 3 and the splicing cassette 1 is mounted on the receptacle 2. The carrier plate 3 is provided with a rotational or fastening element 5 on which it can be releasably fastened in a fixing mechanism or structure.

A modification of the arrangement of FIG. 1 is illustrated in FIG. 2 and includes the carrier plate 3, which is equipped with the splicing cassette 1 on one side, which is the upper side as illustrated, and the receptacle 2 for the leads 4 being secured on a lower or bottom side. Thus, the carrier plate 3 extends between the cassette and the receptacle. In this arrangement, the receptacle 2 can also be formed only of a plurality of angle-like hooks (shown in FIG. 3) which form guides and a holder for the lead reserve 4 on one surface, which is the bottom surface, of the carrier plate 3.

Another modification is a U-shaped carrier plate having two movable legs 3a and 3b, as illustrated in FIG. 3. The splicing cassette 1 and the associated lead reserve 4 of the receptacle 2 are now arranged lying opposite one another inside the U shape of the supporting plates or legs 3a and 3b. Other units, such as a receptacle 2a for lead reserves 4a, can be placed on the bottom of the leg 3a while another splicing cassette 1b can be disposed on the top surface of the leg 3b. It should be noted that the receptacle 2 is formed by hooks extending from the bottom surface of each of the legs 3a and 3b. The legs 3a and 3b are mounted by their fastening elements 5 in a fastening means 6 which allows the pivoting or rotating of the plates to gain access to the interior of the U-shaped carrier. For example, the leg 3b can be pivoted upward to obtain access to the splicing cassette 1.

In traditional splicing blocks, the individual splicing cassettes 7 are stacked together and then are held, as illustrated in FIG. 4, by a pin 8. When a splicing cassette 7a must now be made accessible, this can only occur by undoing the entire block so that the surveyability, particularly with respect to the lead reserve is lost as a result thereof.

Figure 5:
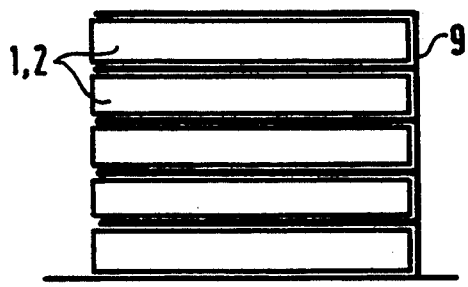
FIG. 5 is an end view of a fan-shaped fixing structure with splicing cassettes and carrier plates in accordance with the present invention.

A form of the fixing means 9 is shown as a structure in FIG. 5 which has a plurality of U-shaped drawers or slots that are formed in the equipped carrier plate together with the splicing cassette 1 and its respective receptacle 2 are capable of being inserted into these slots. A surveyable deposit is established in this way wherein each carrier plate is accessible by itself without other carrier plates having to be removed.

Figure 6:
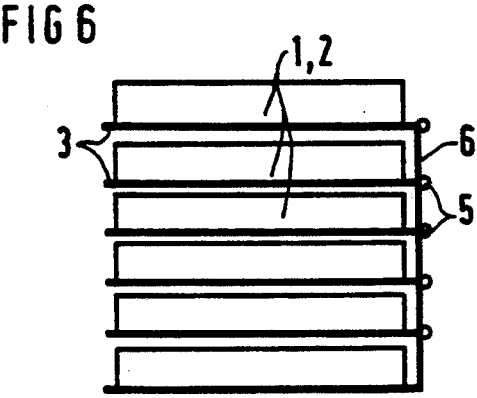
FIG. 6 is a modification of the fan-shaped fixing mechanism and structure with a one-sided swing or, respectively, articulate mechanism.

A modification of the arrangement illustrated in FIG. 5 is shown in FIG. 6, wherein the individual drawers or slots can be swung open. The individual carrier plates 3 are connected on one end or edge via a swing or articulate mechanism 5 or a swinging leg 6, which makes it possible that the desired splicing cassette can be uncovered by swinging the splicing cassettes that lie higher up in the arrangement out of the way.

A cassette carrier 10, which has a shape substantially illustrated in FIG. 5, can be incorporated in a portion 16 of a cable sleeve, as illustrated in FIG. 7. This cassette 10 is formed by an arbitrary plurality of angle plates 24, four of them in the illustrated case, plus an upper plate 18. These plates 24 and the upper plate 18 are secured to two rods 19, which are received in slots or abutments 12 of the sleeve portion 16 to form a plug-in connection therebetween.

As illustrated in FIGS. 7–10, each of the angle plates 24, along one edge, is provided with a flange 25 which is secured to the rods 19. On each end, a nub 21 is provided for engaging a center of a splicing cassette 11 which is inserted in the opening formed by two adjacent plates 24 or the uppermost plate 24 and the lid or top plate 18. To prevent movement of the cassette in a direction outward from the flanges 25, shaped angles 20 are positioned on the opposite edge (see FIG. 7). Thus, a splicing cassette 11 will be held in the space. The uppermost splicing cassette 11 is covered by the cover plate 18. This has projections on the front edge. A lifting of the upper plate 18 allows the cassette carrier 10 to be opened somewhat so that the splicing cassettes 11 can be easily removed over the nubs 21. The angled upper plate 18 is bevelled on its sides as are each of the plates 24 in order to guarantee an easy introduction and removal of the splicing cassettes 11.

The entire cassette carrier 10, as mentioned, is mounted in the sleeve portion 16 by having the ends of the rods 19 plugged into suitable abutments or sockets 12. These sockets 12 are multiplied, for example, in both longitudinal sleeve sides so that the cassette carrier 10 can be positioned in the sleeve portion 16 at any location, which is important in view of the optimum guidance of the leads. The length of the lead bundle thereby no longer plays a part as in the sleeves set forth above, since a significantly greater variability is established here.

In addition, by plugging the cassette carrier 10 into a higher installation position, the holder then will project beyond the sleeve edge. There is the possibility of being able to implement installation jobs, such as splicing, cable interception, introduction of additional cables within the lower sleeve part, etc., more easily.

The principle of the variably pluggable cassette carrier 10 will allow the employment of other splicing cassettes and other types of splices. For example, the splicing cassettes can, thus, also be employed wherein the leads are not conducted out of the narrow side as in the standardized splicing cassette, but from the wide or broader side.

It is also set forth in this Figure that the lead reserve 122 can be guided, for example, under the cassette carrier 10. For example, the sealing member 15, at each end of the cable sleeve portion 16, will have half of the introduction openings which form the openings 23 for the cables 14 or, respectively, 17 together with the corresponding recesses in the side face of the sleeve 16. As warranted, these cable introduction openings can be respectively matched to the diameter of the cable. The sealing occurs in a known way with sealants and/or molding compounds.

As shown in FIGS. 8–10, the angled upper plate 18 has a lateral flange or side that is formed in two portions 22 and one portion 22a. As illustrated, these portions are split adjacent the lower edge so that they hook onto the flange 25 of the second from the top plate 24a, as best shown in FIG. 10.

Although various minor modifications may be suggested by those versed in the art, it should be understood that we wish to embody within the scope of the patent granted hereon all such modifications as reasonably and properly come within the scope of our contribution to the art.

We claim:

1. In an arrangement comprising depositing splicing cassettes and light waveguides within a cable sleeve, wherein a receptacle for excess length of the light waveguide leads is provided for every splicing cassette, the improvements comprising each splicing cassette and its receptacle for excess length of the light waveguide leads being arranged on a common carrier plate, the carrier plate having a U-shaped cross sectional configuration formed of a pair of legs, said legs being mounted on one side by hinges to allow opening of the legs to gain access to the interior thereof, the splicing cassette being mounted on the interior of one of the pair of legs and the receptacle being provided on the other leg, and fixing means for detachably holding each of the carrier plates so that every carrier plate can be individually moved from the fixing means with the remaining carrier plates remaining in their desired positions therein.

2. In an arrangement according to claim 1, wherein the fixing means includes an articulation for holding the carrier plate to enable a swinging movement thereof.

3. In an arrangement according to claim 1, wherein the fixing means includes a hinge to enable a swinging or pivoting of the carrier plate relative to the structure of the fixing means.

* * * * *